UNITED STATES PATENT OFFICE.

PETER T. AUSTEN AND FREDERICK J. MAYWALD, OF NEW YORK, AND FRANCIS X. GOVERS, OF OWEGO, NEW YORK.

STRIPPING PAINT AND VARNISH REMOVER AND PROCESS OF MAKING SAME.

No. 871,750.　　　　Specification of Letters Patent.　　　　Patented Nov. 19, 1907.

Application filed April 16, 1907. Serial No. 368,486.

*To all whom it may concern:*

Be it known that we, PETER T. AUSTEN, a citizen of the United States, residing in the borough of Manhattan, city, county, and State of New York, FREDERICK J. MAYWALD, a citizen of the United States, residing in the borough of Brooklyn, county of Kings, city and State of New York, and FRANCIS X. GOVERS, a citizen of the United States, residing at Owego, county of Tioga, and State of New York, have invented certain new and useful Stripping Paint and Varnish Removers and Processes of Making Same; and we hereby declare that the following is a full, clear, and exact description of the same, such as will enable those skilled in the art to which it appertains to make, practice, and use the said processes and paint-removers.

This invention relates to stripping paint removers and processes of making the same, and consists in a stripping or peeling paint or varnish remover having the power of softening and loosening the coating on painted or varnished surfaces and of coalescing with such softened and loosened coating to form consistent leathery or rubbery masses of some degree of mechanical strength, readily removable as a whole from the coated surfaces by simply lifting and peeling or by stripping; and in processes of preparing such a remover; all as more fully hereinafter set forth and as claimed.

We have discovered that the concentrated liquid fatty acids, such as acetic, formic, propionic or butyric acid, or their substitution products, singly or admixed, when treated by dissolving colloids therein, are efficient in softening and disintegrating paint, and that neutral volatile solvents may be usefully incorporated with the removers so formed. Compound removers of this latter type are described and claimed in co-pending applications Nos. 356,347, and 356,348, filed February 8, 1907. In these compound removers, as there described and claimed, the volatile solvents form the chief component, the colloided acid serving mainly as a carrier for emulsifying the solvents and imparting the necessary consistency to adapt the removers for localized action on a painted surface or for use in non-horizontal position, though it also contributes to the solvent action on varnishes and paint vehicles while having a specific action on such pigments as white lead. With white lead and zinc white paints, this action of the acid becomes quite important, partly because of the loosening of the pigment particles which it effects, and partly because in some cases incident evolution of gas causes a loosening of the paint as a whole.

We have now discovered that by certain alterations in proportions and constituents of these colloided acid removers, and particularly by increasing the relative amount of colloid and of acid to that of the volatile solvent in the mixture, removers of a new type may be produced, having not only the power of softening, disintegrating and loosening paint and varnish but the additional power of combining with such softened and loosened paint or varnish to form tough, coherent masses or skins which may be readily lifted and stripped or peeled as such from the coated surface.

In the present invention in producing stripping removers, the proportion of colloid in the acid, and of the colloided acid in the remover, is preferably so high as to give the remover as a whole, a relatively thick or salve-like consistency. Preferably, there is less of the volatile solvent than of the colloided acid in the remover, and such volatile solvent is preferably, at least in greater part, one or more of the aromatic hydrocarbons. The present application concerns such stripping or peeling removers and processes of preparing the same.

In another application, Ser. No. 368,488, filed April 16, 1907, we have described and claimed this process of removing paint and varnish.

The importance of this stripping or peeling property of the new removers is obvious because no special care or skill on the part of the operator is required, because the time and labor involved in removing of paint and varnish is greatly decreased, and because the paint or varnish may be removed from carved woodwork and other surfaces of intricate contour or irregular surface without the necessity for the use of scraping or other tools; a result much to be desired since it avoids all possibility of injury to such surfaces. Upon application of the new removers to such a surface after a short time the whole coating of paint or varnish may be lifted and peeled or stripped off a coherent skin or mass, leaving depressions and cavities as readily as flat surfaces. The surface is left substantially clean, and after a simple wiping may be recoated or otherwise treated. Removers having this property of softening paint or varnish and loosening its adhesion to the underlying surface while simultaneously forming such paint or varnish into a coherent, leathery or rubberlike film, suitable for stripping or peeling off as a whole, may be made with the stated colloided acids as a basis or in other ways, as hereinafter set forth.

While colloided concentrated liquid fatty acids may be used alone, that is, without the addition of other bodies of a solvent character, and will soften many paints or varnishes, loosen them from underlying surfaces and bind them into coherent, stripable or peelable skins or layers, they are improved for general purposes by the addition of more or less of other substances possessing a different solvent nature. This makes them better adapted to deal with any paint or varnish, and with all the constituents of any one paint or varnish. The additional solvent body may be one or more of the ordinary volatile solvents, such as the aromatic hydrocarbons, and particularly benzol, toluol or xylol, which are found to be desirable additions as they exercise a specific softening action upon the ordinary oily paint and varnish vehicles. But where the skin-forming result is desirable, the total proportion of volatile solvent in the mixture should not be unduly great as this would necessarily result in a diminution of the total proportion of colloid.

Colloidal bodies capable of forming tough skins other than the described proteids may be used to reinforce them or to replace them. For the volatile solvent component of the remover any of the well-known volatile solvents usually employed in removing paint and varnish may be here used, as for instance, benzin, "methyl acetone", acetone, methyl acetate, ethyl acetate, etc., fusel oil, acetone oils, tar oils, wood-tar oils, rosin oil, rosin spirit, turpentine and the like.

Incorporation of phenols in the remover, either with or without volatile solvents in addition, is also frequently useful. While phenols are solvents of quite different character in many respects from the concentrated liquid fatty acids, they share with such acids the property of being alike good paint and varnish softeners and good solvents for skin-forming colloids. Where the odor of the ordinary crude or commercial phenols is not desirable in the remover, as is frequently the case, they may be preliminarily treated by reacting upon, or "condensing", them with the acid to be used. This may be done by simply heating the acid and the phenol together, either with or without pressure, and with or without the presence of condensing or facilitating reagents. Dry acetate of sodium is a useful facilitating agent in condensing phenols with concentrated acetic acid as it combines with the water present or liberated in the reaction and keeps the acid strong. Chlorid of aluminium is also useful.

The products obtained from phenols and concentrated liquid fatty acids by the described process share the colloid-dissolving and paint-softening powers of their components, and are equally useful as ingredients of the stripping or peeling removers, while they lack the strong odor of the crude phenols. As to the exact nature of the reactions which take place in performing the described process, uncertainty exists. Some phenol ester may be formed, though the reaction product, herein called a "condensation product" for the sake of a name, still contains free acid and free phenol and is acid in nature. It however lacks the strong odor of the crude phenolic body used. Any of the ordinary phenols, such as carbolic or cresylic acids, or crude phenolic mixtures like the creosotes or tar oils and the like may be employed. These phenols, such as cresylic acid, colloided by solution of colloids, such as casein, therein, are also applicable, either alone or in conjunction with suitable volatile solvents, as stripping or peeling paint removers. The same is true of their condensation products.

In preferred forms of our removers, we employ both a concentrated liquid fatty acid and a phenol, dissolving a colloid, such as casein, in either or both, enough of the colloid being preferably employed to give the resulting mass a salve-like consistency. Such a colloided, phenolated concentrated liquid fatty acid makes a desirable form of stripping remover though it may be further improved for this purpose by working in some volatile solvent, preferably one or more of the aromatic hydrocarbons.

Concentrated formic or acetic acid, colloided by dissolved casein and further treated by incorporating an aromatic hydrocarbon, such as toluol, makes a very good form of remover. Where the stripping or peeling function is desired, however, as stated, the amount of this hydrocarbon should not be unduly great, but where a mere softening action on paint or varnish is desired, the proportion may be greater, even up to a comparatively thin emulsion of such a hydrocarbon, or plurality of such hydrocarbons, in a little colloided acid. Similarly, colloided phenols may be employed alone or in conjunction with an aromatic solvent.

A stripping or peeling remover suitable for our purpose may be made by dissolving 400 grams of casein in 500 cc. of glacial acetic acid and 1,000 grams of cresylic acid. This phenolated and colloided acid may be used as it is, or 1,000 cc. of toluol or benzol may be incorporated with it. Another remover may be made from 1,000 grams of concentrated formic acid, preferably at least 90 per cent. in strength, 1,000 grams of casein and 2,000 grams of cresylic or carbolic acid. It is preferable to add the phenol, at least in part, to the formic acid before adding the casein, casein being so soluble in formic acid that it tends to clump and ball in an inconvenient manner when contacted with it, even in the cold. With the phenol present, solution is more regular. With the remover so formed may be further incorporated 2,000 grams of toluol, xylol or benzol if desired. A third composition may be made by dissolving 2,000 grams of glue or gelatin in 2,000 grams of concentrated formic acid and incorporating 2,000 grams of toluol or benzol.

A stripping or peeling remover comprising a "condensation product" of the described kind may be made by heating together 600 grams of cresylic acid with 400 grams of glacial acetic acid. In the condensation product obtained 400 grams of casein are dissolved. This gives a colloided stripping or peeling remover which may be further improved by working in 400 grams of toluol and 700 grams of a 10 per cent. solution of gutta percha in benzol.

A colloided phenol suitable for the present purposes may be obtained by dissolving 2,000 grams of gelatin in 2,000 grams of cresylic or carbolic acid. Addition of toluol or benzol improves the remover for the intended purpose.

In their present preferred form, stripping or peeling removers, made with or without volatile solvents, should contain enough colloid to impart to them a fairly thick or semi-solid consistency; a consistency, say, between that of a sluggishly flowing oil and that of a plastic jelly or thick salve. The presence of considerable colloid is of advantage to the strength and tenacity of the coherent skin or layer to be formed in and of the paint or varnish to be stripped or peeled. A salve-like consistency, moreover, is advantageous in the use of the stripping remover as it permits a thorough and even application of the remover in layers of economical and efficient thickness on all parts of the coated surface to be treated, whatever the contour or shape of such surface and irrespective whether it be horizontal, vertical or inclined. In such consistency the stripping remover may be applied as easily as paint and in much the same way. After it has been applied and allowed to remain a short time, the paint or varnish treated may be simply lifted and pulled off the surface, peeling or stripping away from it in coherent layers, and leaving the interior of cavities as clean as flat surfaces. The advantages of this in treating carved surfaces, moldings and the like are obvious.

The exact reactions which take place when these stripping or peeling removers are applied to a paint or varnish, probably vary with each particular paint or varnish. It may be in the case of a typical remover which contains a fatty acid and phenol with casein dissolved therein, that the phenomena are in the nature of one solute displacing another from solution; that the oily or resinous components of the paint vehicle or varnish in a way displace the casein, throwing it out either as such, or in some combination with these or other components of the paint or varnish, in a form adapted to produce a coherent mass of some mechanical strength, binding together the particles of the loosened and disintegrated paint or varnish. In the case of white lead paint and other paints containing pigments more or less soluble in the acid employed, it may be that the base in dissolving in the acid forms a compound with which casein gives a precipitate, forming acetate of lead for instance, and that the casein precipitates such base, releasing acid which dissolves more pigment. But as stated, the reactions which take place probably differ specifically with every specific paint or varnish and we must content ourselves with setting forth the result attained, the formation of the tough, coherent stripping or peeling skin or layer, without going into the probable reactions involved in more detail.

What we claim is:—

1. A stripping paint and varnish remover comprising a plurality of paint-softening solvents and sufficient proteid in one such solvent to give the remover a salve-like consistency.

2. A stripping paint and varnish remover comprising a plurality of paint-softening solvents, one of said solvents being a neutral volatile solvent, and sufficient proteid matter dissolved in another solvent to give the remover a salve-like consistency.

3. A stripping paint and varnish remover comprising a plurality of paint-softening solvents and sufficient casein dissolved in one such solvent to give the remover a salve-like consistency.

4. A stripping paint and varnish remover comprising a plurality of paint-softening solvents, one of said solvents being a neutral volatile solvent, and sufficient casein dissolved in another solvent to give the remover a salve-like consistency.

5. A stripping paint and varnish remover comprising a plurality of paint-softening solvents one of said solvents being acid in character and one being a neutral volatile solvent, and sufficient dissolved colloid to give the remover a semi-solid consistency.

6. A stripping paint and varnish remover comprising a plurality of paint-softening solvents one of said solvents being acid in character and one being a neutral volatile solvent, and sufficient dissolved casein to give the remover a semi-solid consistency.

7. A stripping paint and varnish remover comprising a concentrated liquid fatty acid, a phenol and sufficient dissolved colloid to give the remover a semi-solid consistency.

8. A stripping paint and varnish remover comprising a concentrated liquid fatty acid, a phenol and sufficient dissolved casein to give the remover a semi-solid consistency.

9. A stripping paint and varnish remover comprising an acid reacting composition of concentrated liquid fatty acid and a phenol condensed together and a dissolved colloid.

10. A stripping paint and varnish remover comprising an acid reacting composition of concentrated liquid fatty acid and a phenol condensed together and dissolved casein.

11. A stripping paint and varnish remover comprising an acid reacting composition of a concentrated liquid fatty acid, a phenol, a dissolved colloid, and neutral volatile solvent.

12. A stripping paint and varnish remover comprising a concentrated liquid fatty acid, a phenol, dissolved casein and neutral volatile solvent.

13. A paint and varnish remover comprising a paint-softening solvent of acid character having a colloid dissolved therein and aromatic hydrocarbon.

14. A paint and varnish remover comprising a paint-softening solvent having casein dissolved therein and aromatic hydrocarbon.

15. A paint and varnish remover comprising concentrated acetic acid, a phenol and a dissolved colloid.

16. A paint and varnish remover comprising concentrated acetic acid, a phenol and dissolved casein.

17. A paint and varnish remover comprising concentrated acetic acid, a dissolved colloid, and aromatic hydrocarbon.

18. A paint and varnish remover comprising concentrated acetic acid, dissolved casein and aromatic hydrocarbon.

19. A stripping paint and varnish remover comprising concentrated acetic acid, an aromatic paint softening solvent and enough dissolved colloid to give the remover a semi-solid consistency.

20. A stripping paint and varnish remover comprising concentrated acetic acid, an aromatic paint softening solvent and enough dissolved casein to give the remover a semi-solid consistency.

21. The process of preparing a stripping paint and varnish remover which comprises mixing a concentrated liquid fatty acid and a phenol and dissolving a colloid therein.

22. The process of preparing a stripping paint and varnish remover which comprises mixing a concentrated liquid fatty acid and a phenol and dissolving casein therein.

23. The process of preparing a stripping paint and varnish remover which comprises mixing and heating a concentrated liquid fatty acid and a phenol together and dissolving a colloid therein.

24. The process of preparing a stripping paint and varnish remover which comprises mixing and heating a concentrated liquid fatty acid and a phenol together and dissolving casein therein.

25. The process of preparing a stripping paint and varnish remover which comprises mixing concentrated acetic acid and a phenol and dissolving a colloid therein.

26. The process of preparing a stripping paint and varnish remover which comprises mixing concentrated acetic acid and a phenol and dissolving casein therein.

27. The process of preparing a stripping paint and varnish remover which comprises mixing and heating concentrated acetic acid and a phenol together and dissolving a colloid therein.

28. The process of preparing a stripping paint and varnish remover which comprises mixing and heating concentrated acetic acid and a phenol together and dissolving casein therein.

29. The process of preparing a stripping paint and varnish remover which comprises mixing a concentrated fatty acid and a phenol, dissolving a colloid therein and subsequently working in neutral volatile solvent.

30. The process of preparing a stripping paint and varnish remover which comprises mixing a concentrated fatty acid and a phenol, dissolving casein therein and subsequently working in volatile solvent.

31. The process of preparing a stripping paint and varnish remover which comprises mixing a concentrated fatty acid and a phenol, dissolving a colloid therein and subsequently working in volatile solvent.

32. The process of preparing a paint remover which comprises mixing a concentrated liquid fatty acid and a phenol and heating the mixture to condense and deodorize the same and subsequently incorporating other bodies capable of reacting on paint and varnish.

33. A paint remover comprising the products of reaction of a concentrated liquid fatty acid and a phenol heated together, and also other bodies reacting on paint and varnish.

In testimony whereof we affix our signatures, in the presence of two witnesses.

PETER T. AUSTEN.
FREDERICK J. MAYWALD.
FRANCIS X. GOVERS.

Witnesses:
MARTIN E. STINER,
K. P. McELROY.